United States Patent
Yannick et al.

(10) Patent No.: US 10,455,450 B2
(45) Date of Patent: Oct. 22, 2019

(54) METHODS AND APPARATUS FOR OPTIMIZING LOAD RE-BALANCING FOR DEDICATED CORE NETWORK IN WIRELESS COMMUNICATION SYSTEM

(71) Applicant: LG ELECTRONICS INC., Seoul (KR)

(72) Inventors: Lair Yannick, Seoul (KR); Hyunsook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 61 days.

(21) Appl. No.: 15/542,372

(22) PCT Filed: Jan. 7, 2016

(86) PCT No.: PCT/KR2016/000147
§ 371 (c)(1),
(2) Date: Jul. 7, 2017

(87) PCT Pub. No.: WO2016/111565
PCT Pub. Date: Jul. 14, 2016

(65) Prior Publication Data
US 2018/0279174 A1   Sep. 27, 2018

Related U.S. Application Data

(60) Provisional application No. 62/100,853, filed on Jan. 7, 2015.

(51) Int. Cl.
*H04W 28/08* (2009.01)
*H04W 8/06* (2009.01)
(Continued)

(52) U.S. Cl.
CPC ........... *H04W 28/08* (2013.01); *H04W 8/065* (2013.01); *H04W 40/34* (2013.01); *H04W 8/02* (2013.01); *H04W 40/18* (2013.01); *H04W 84/042* (2013.01)

(58) Field of Classification Search
CPC .... H04W 28/08; H04W 8/065; H04W 84/042
See application file for complete search history.

(56) References Cited

U.S. PATENT DOCUMENTS 8,854,960 B2 * 10/2014 Jain .................. H04W 4/70
370/230
9,674,749 B2 * 6/2017 Jeong ................ H04W 36/14
(Continued)

FOREIGN PATENT DOCUMENTS

| WO | 2010080056 | 7/2010 |
|----|------------|--------|
| WO | 2012100199 | 7/2012 |
| WO | 2013169822 | 11/2013 |

OTHER PUBLICATIONS

PCT International Application No. PCT/KR2016/000149, International Search Report dated Apr. 19, 2016, 4 pages.
(Continued)

*Primary Examiner* — Sharad Rampuria
(74) *Attorney, Agent, or Firm* — Lee Hong Degerman Kang & Waimey

(57) ABSTRACT

A method and apparatus for performing load re-balancing for the dedicated core network in a wireless communication system is provided. An evolved NodeB (eNB) which supports a dedicated core network receives a mobility management entity group identity (MMEGI) of an MME pool, corresponding to the dedicated core network, from a UE which is attached to a first MME of the MME pool. The eNB redirects the UE to a second MME of the MME pool by using the MMEGI of the MME pool.

4 Claims, 14 Drawing Sheets

(51) Int. Cl.
    *H04W 40/34*    (2009.01)
    *H04W 8/02*     (2009.01)
    *H04W 40/18*    (2009.01)
    *H04W 84/04*    (2009.01)

(56) References Cited

U.S. PATENT DOCUMENTS

| | | | | |
|---|---|---|---|---|
| 9,832,719 | B2* | 11/2017 | Horn | H04W 8/065 |
| 2011/0134841 | A1* | 6/2011 | Shaheen | H04W 4/70 |
| | | | | 370/328 |
| 2011/0261715 | A1 | 10/2011 | Norefors et al. | |
| 2011/0269499 | A1* | 11/2011 | Vikberg | H04W 28/08 |
| | | | | 455/524 |
| 2012/0106488 | A1 | 5/2012 | Nylander et al. | |
| 2013/0130684 | A1* | 5/2013 | Gomes | H04W 8/186 |
| | | | | 455/435.1 |
| 2013/0303166 | A1* | 11/2013 | Jain | H04W 4/90 |
| | | | | 455/435.2 |
| 2014/0301366 | A1 | 10/2014 | Guo | |

OTHER PUBLICATIONS

PCT International Application No. PCT/KR2016/000147, International Search Report dated Apr. 12, 2016, 7 pages.

\* cited by examiner

METHODS AND APPARATUS FOR OPTIMIZING LOAD RE-BALANCING FOR DEDICATED CORE NETWORK IN WIRELESS COMMUNICATION SYSTEM

CROSS-REFERENCE TO RELATED APPLICATIONS

This application is the National Stage filing under 35 U.S.C. 371 of International Application No. PCT/KR2016/000147, filed on Jan. 7, 2016, which claims the benefit of U.S. Provisional Application No. 62/100,853 filed on Jan. 7, 2015, the contents of which are all hereby incorporated by reference herein in their entirety.

BACKGROUND OF THE INVENTION

Field of the Invention

The present invention relates to wireless communications, and more particularly, to a method and apparatus for optimizing load re-balancing for a dedicated core network in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

3GPP networks are beginning to support devices and customers with very different characteristics, such as machine type devices, mobile virtual network operator (MVNO), data usage, etc. These classes of devices and customers may have different requirements from the core network in terms of optional feature support, traffic characteristic support, availability, congestion management, ratio of signaling to user plane traffic, etc. The classes of devices/customers will continue to increase. One cost effective mechanism for operators to support these different classes of devices and customers is to create separate dedicated core networks consisting of specialized core network elements that are designed and deployed to meet the requirements of these different devices and customers. It is cost-effective, as the network availability or redundancy requirements may be easier met with different hardware and/or software than the existing core network. Also, creating separate core networks enables independent scaling or specific feature provisioning for specific user or traffic types and isolating specific users and traffic from each other.

The load re-balancing functionality can be used when one core network node is removed from a pool area, and enables UEs that are registered on one core network node to be moved to another core network node.

Interaction between dedicated core network assignment and load re-balancing functionality has not been investigated yet. Accordingly, a method for optimizing load re-balancing for the dedicated core network may be required.

SUMMARY OF THE INVENTION

The present invention provides a method and apparatus for optimizing load re-balancing for a dedicated core network in a wireless communication system. The present invention provides a method and apparatus for enhancing load re-balancing functionality so that a user equipment (UE) registered on a core network node which is removed is kept in the same dedicated core network.

In an aspect, a method for performing, by an evolved NodeB (eNB) supporting a dedicated core network, load re-balancing for the dedicated core network in a wireless communication system is provided. The method includes receiving a mobility management entity group identity (MMEGI) of an MME pool, corresponding to the dedicated core network, from a UE which is attached to a first MME of the MME pool, and redirecting the UE to a second MME of the MME pool by using the MMEGI of the MME pool.

The MMEGI of the MME pool may be received from the UE via a radio resource control (RRC) Connection Setup Complete message.

The MMEGI of the MME pool may be included in a globally unique MME identity (GUMMEI) corresponding to the first MME.

The method may further include receiving a cause value indicating load re-balancing for the dedicated core network from the first MME. The cause value may be received from the first MME via an S1 UE Context Release Command message. The method may further include transmitting the cause value to the UE. The cause value may be transmitted to the UE via an RRC Connection Release message.

The method may further include receiving a cause value indicating load re-balancing from the first MME.

The method may further include transmitting information indicating whether or not the eNB supports the dedicated core network functionality to the UE. The information may be transmitted via a system information block (SIB).

In another aspect, a method for transmitting, by a user equipment (UE), a mobility management entity group identity (MMEGI) in a wireless communication system is provided. The method includes receiving an indication related to a dedicated core network from an evolved NodeB (eNB), and transmitting an MMEGI of an MME pool corresponding to the dedicated core network to the eNB according to the indication.

The indication may be a cause value indicating load re-balancing for the dedicated core network, and the cause value may be received via a radio resource control (RRC) Connection Release message.

The indication may be information indicating whether or not the eNB supports the dedicated core network functionality, and the information may be received via a system information block (SIB). When the information indicates that the eNB supports the dedicated core network functionality, the MMEGI of the MME pool may be transmitted.

The MMEGI of the MME pool may be transmitted via a radio resource control (RRC) Connection Setup Complete message.

Load re-balancing can be optimized when a dedicated core network functionality is introduced, and thus, another re-routing of a user equipment (UE) via an evolved NodeB (eNB) can be avoided.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
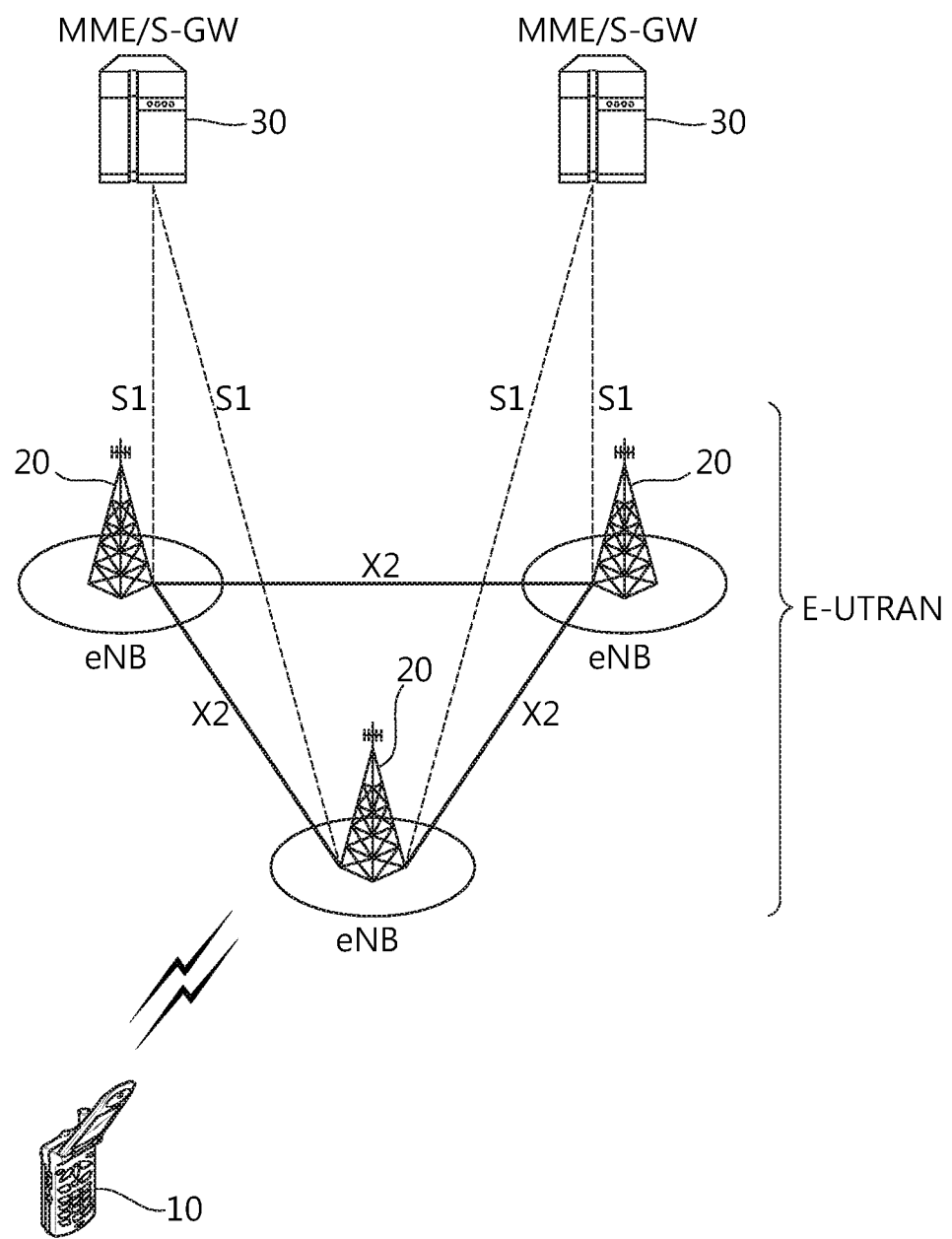
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a serving gateway (S-GW). The MME/S-GW 30 may be positioned at the end of the network. For clarity, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
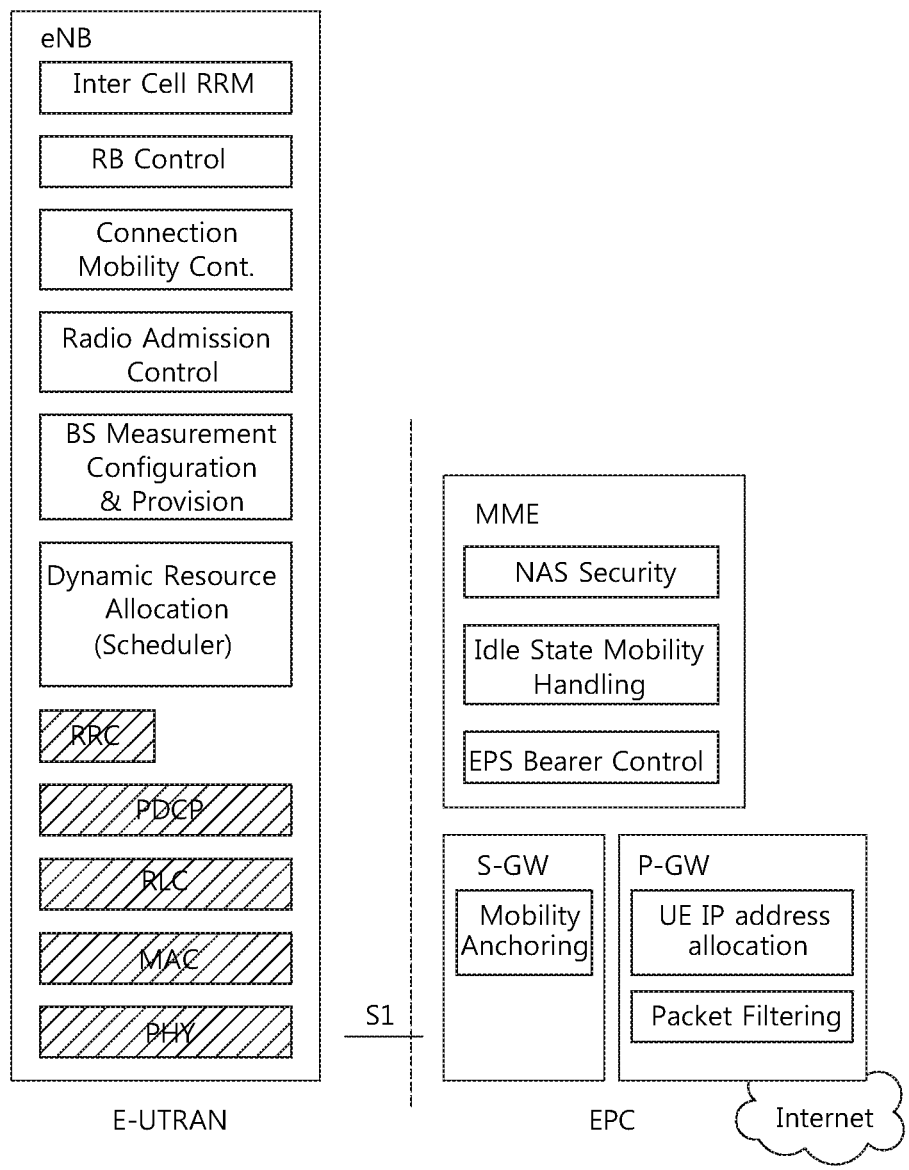
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
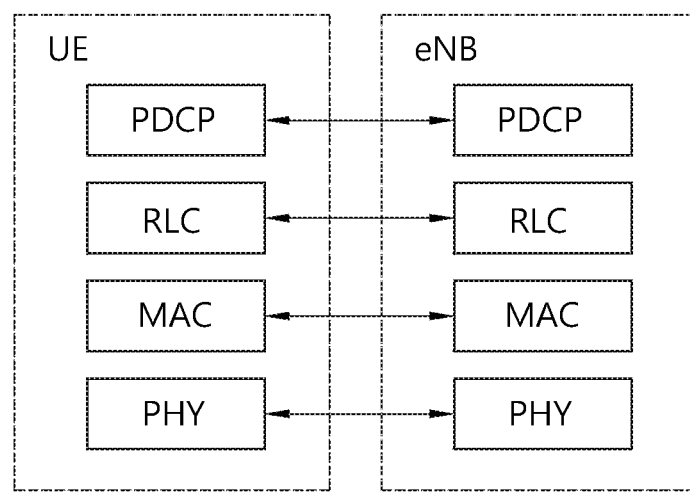
FIG. 3 shows a block diagram of a user plane protocol stack of an LTE system.
Figure 4:
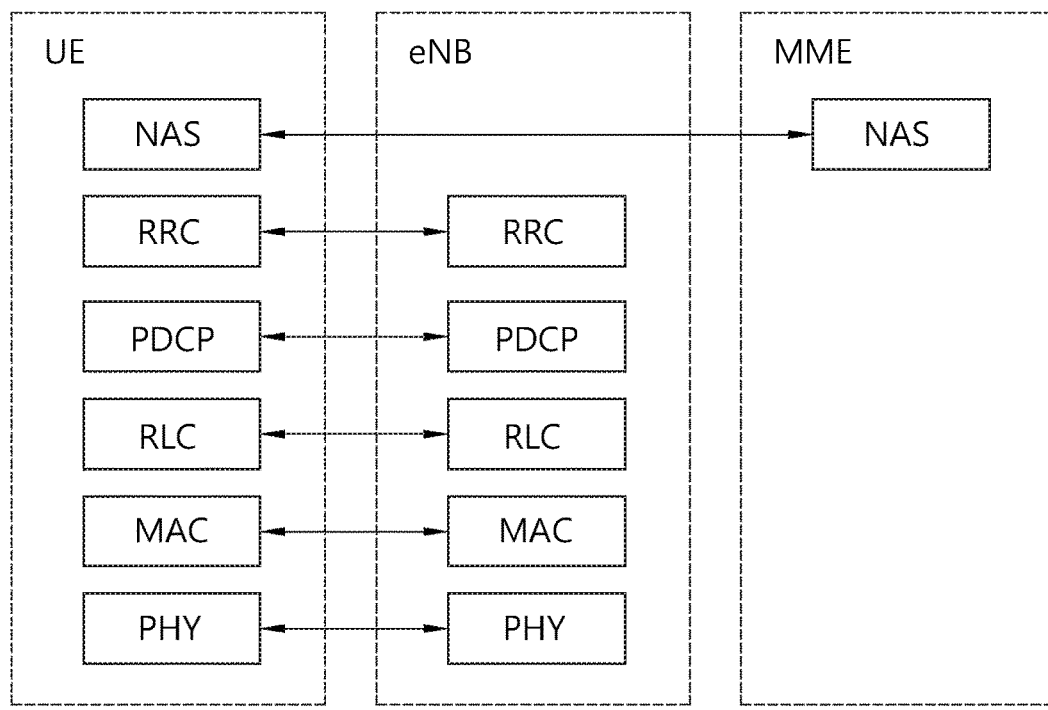
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e. between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Hereinafter, a dedicated core network (DCN) is described. A mobile network operator may choose to deploy one (or more) dedicated core networks within a PLMN with each core network dedicated for specific type(s) of subscriber. This new feature is under investigation in 3GPP SA2 and is known as DECOR functionality. The purpose with a dedicated core network may be to provide specific characteristics and/or functions or isolate specific UEs or subscribers, e.g. machine-to-machine (M2M) subscribers, subscribers belonging to a specific enterprise or separate administrative domain, etc. The specific dedicated core network that serves a UE is selected based on subscription information and operator configuration, without requiring the UEs to be modified. A dedicated core network may be assumed to serve only specific subscriber(s). A dedicated core network may comprise one or more MME/SGSN and it may comprise one or more S-GW/P-GW. When the P-GW is part of a dedicated core network, the policy and charging rules function (PCRF) may be shared or specific for the dedicated core network. Different dedicated core networks may provide different characteristics and functions.

The main architecture enhancements for the dedicated core network are to route and maintain UEs in their respective dedicated core network (for UEs with assigned DCN). The following architecture requirements shall be met by all proposed solutions:

There shall be no impacts to UE.
Support of dedicated core networks shall not require the use of additional PLMN-IDs, e.g. to separate different dedicated core networks.
It shall be possible to deploy multiple dedicated core-networks sharing the same RAN.
The architecture should support dedicated core networks for specific UEs or subscribers.
Networks deploying dedicated core networks may have a common core network (CCN), which may be assigned to UEs when a DCN is not available. A common core network might have limitations in terms of characteristics and functionality.
A UE connected to a DCN is supported within that specific DCN and the CCN when needed.
The architecture should support scenarios where the dedicated core-network is only deployed in a part of the PLMN, e.g. only one RAT or in a part of the PLMN area. Each dedicated MME/SGSN supports the DECOR related functionality over its entire service area. Heterogeneous (partial) support of a dedicated core network may, depending on operator deployment and configuration, result in service with different characteristics or functionality when the UE is camping outside service area or RAT of the dedicated core network.
Mechanisms shall be supported to enable the redirection of affected attaching/attached UEs to appropriate dedicated core network, e.g. when a dedicated core network is commissioned in a PLMN.
If the dedicated core network is not deployed to serve a particular RAT or service area of PLMN, the UE in that RAT or service area may be served by MME/SGSN from a common core network and may continue to be served by a P-GW from the dedicated core network.

Assignment of the dedicated core network, e.g. dedicated MME/SGSN, is described. The dedicated core network may be assigned during various procedures. For example, the dedicated core network may be assigned during E-UTRAN attach and TAU procedure. For initial MME/SGSN assignment during attach, the following scenarios are covered:

Attach with international mobile subscriber identity (IMSI).
Attach and TAU with globally unique temporary UE identity (GUTI) from old MME/SGSN supporting DECOR.
Attach and TAU with GUTI from old MME/SGSN not supporting or deploying DECOR (e.g. an inter PLMN change with GUTI).

As one solution for assignment of the dedicated core network during E-UTRAN attach and TAU procedure, redirection after update location procedure may be provided. Initial assignment of a dedicated MME/SGSN node is based on subscription information and operator configuration, and may imply a redirection mechanism after the location update procedure, if the initially selected MME/SGSN is not part of the right dedicated core network. In such a case, the initially selected MME/SGSN will request the eNB to reroute the registration message to another MME/SGSN belonging to the right dedicated core network. MMEs that belong to different dedicated core networks have different group identities (MMEGIs). Each MME has configuration about the association of MMEGI to dedicated core network. Similarly for SGSNs, null network resource identifiers (NRIs) are used for the identification of SGSN pools that are associated with different dedicated core networks. Domain name system (DNS) can be used to get the MMEGI of dedicated core networks MME pool instead of this configuration. Once initial assignment of the MME/SGSN is done, coordinated NRIs/MMEGIs are used so that the UE is kept in the right dedicated core network at idle mode mobility.

The attach and TAU procedure is modified to ensure that the UE is served by the appropriate core network. If the eNB/radio network controller (RNC) directs the initial NAS message an MME/SGSN which is not dedicated to serve the subscriber type of the UE, the MME/SGSN after determining the dedicated network for the UE, forwards the initial NAS message of the UE along with the MMEGI/Null-NRI corresponding to core network to the RAN to re-route the NAS message to the MME/SGSN pool dedicated to serve the particular subscriber type of the UE. RAN then reroutes the UE's NAS message to an MME/SGSN dedicated to serve the subscriber type of the UE.

Figure 5:
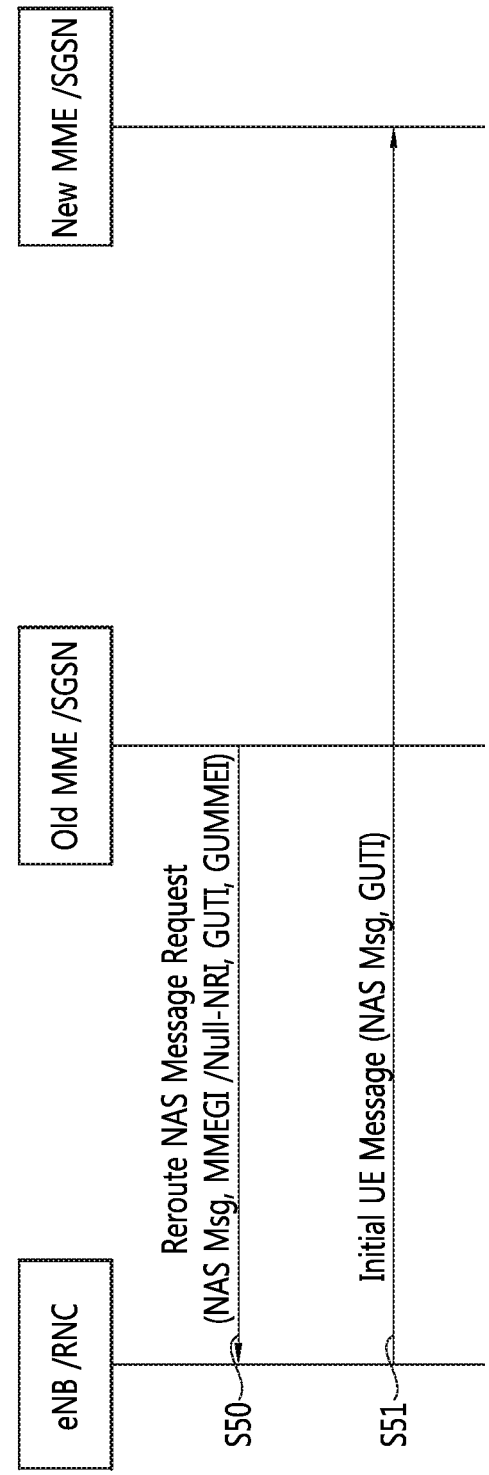
FIG. 5 shows a reroute NAS message procedure.

FIG. 5 shows a reroute NAS message procedure.

When the old MME/SGSN decides to reroute the NAS message to another dedicated core network, in step S50, the old MME/SGSN sends a Reroute NAS Message Request (NAS message, MMEGI/Null-NRI, GUTI, globally unique MME identity (GUMMEI)) to the eNB/RNC which had forwarded the NAS message. The MMEGI (for E-UTRAN) or Null-NRI (for GPRS) corresponds to the MME/SGSNs that belong to the selected dedicated core network. The MME/SGSN is configured with a mapping of MMEGI/Null-NRI to dedicated core network type for the tracking area identity (TAI) of the UE. DNS can be used to get the MMEGI of dedicated core networks MME pool instead of this configuration. In case of E-UTRAN, the MME may also decide to include GUTI, which is used by the new MME to request context information from the old MME. The MME may provide GUMMEI taken from the previously received additional GUTI, if the MMEGI of the target core network matches the MMEGI part of the additional GUTI in attach message.

The eNB/RNC based on the MMEGI/Null-NRI and/or GUMMEI included in the Reroute NAS Request message request selects a new MME/SGSN corresponding to the MMEGI/Null-NRI and/or GUMMEI using existing NAS node selection function (NNSF) functionality. In step SM, the eNB/RNC sends the Initial UE Message to the selected MME/SGSN. The Initial UE Message includes the NAS message and also optionally GUTI, if GUTI was provided in the previous message.

Figure 6:
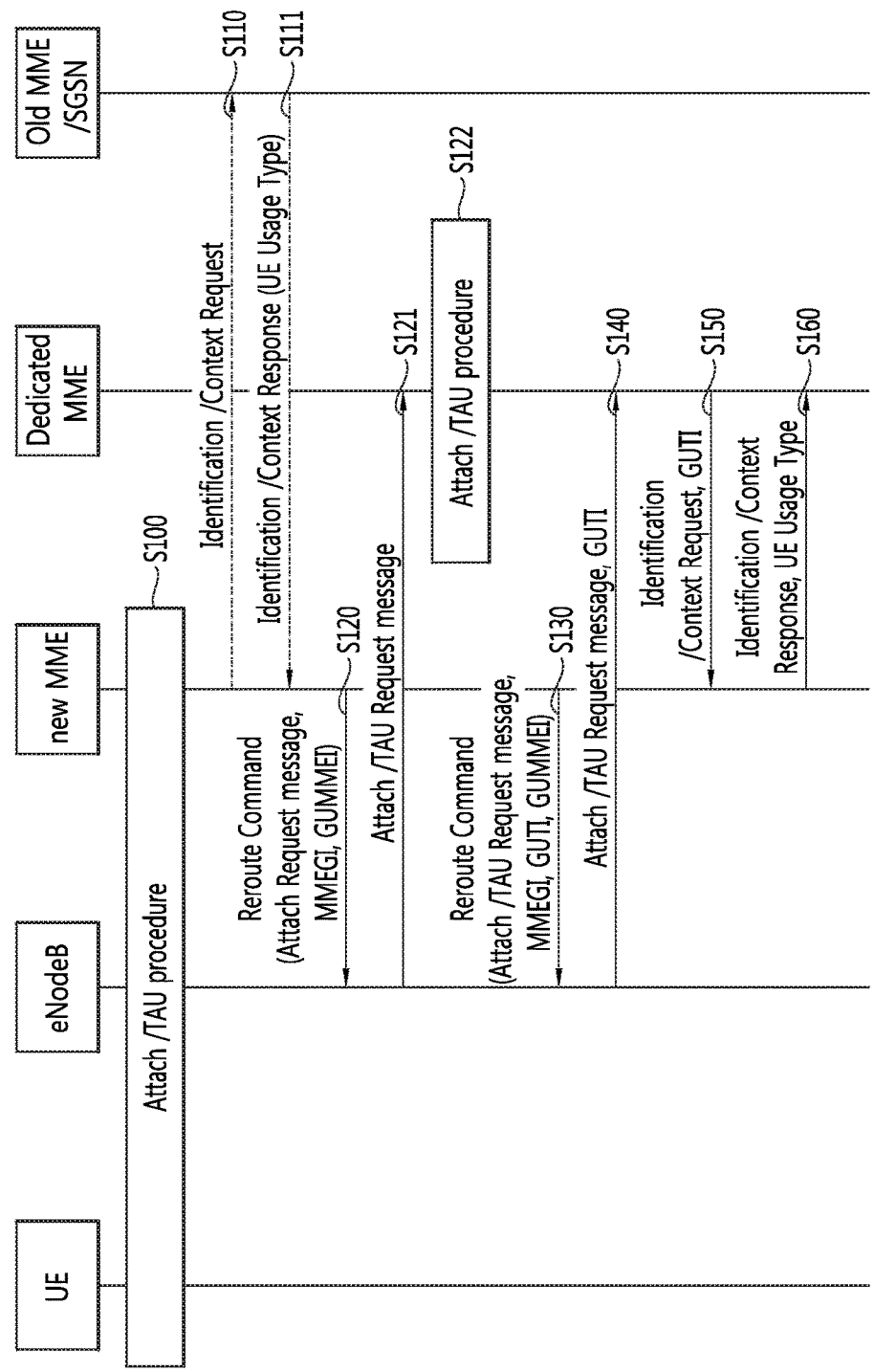
FIG. 6 shows an E-UTRAN attach and TAU procedure with reroute after update location procedure.

FIG. 6 shows an E-UTRAN attach and TAU procedure with reroute after update location procedure.

In step S100, E-UTRAN attach or TAU procedure is performed.

In step S110, the new MME may transmit Identification Request message (for attach) or Context Request message (for TAU) to the old MME/SGSN. If the UE identifies itself with GUTI and the MME has changed, in step S111, the Identification Response message (for attach) or Context Response message (for TAU) may contain the UE usage type information, if available.

In step S120, if dedicated core networks are supported and the new MME does not serve UEs of the UE usage type value contained in the Identification/Context Response message, the new MME sends a Reroute Command message (Attach/TAU Request message, MMEGI, GUMMEI) to the eNB. If the MMEGI received from the MME and the MMEGI in the received GUMMEI matches, the GUMMEI is additionally taken into account for the MME reselection. In step S121, the eNB shall reselect an MME of the indicated type and forward the Attach/TAU Request message to the selected MME. In step S122, the selected MME performs the attach/TAU procedure. The additional GUTI in the Attach/TAU Request message allows the dedicated MME to find any already existing UE context stored in the dedicated MME if included and to skip the unnecessary interaction with the home subscriber server (HSS). If dedicated core networks are supported but the old MME does not provide the UE usage type value with the new MME by the Identification/Context Response message, steps S120, S121 and S122 are skipped.

Thereafter, other steps from the Attach/TAU procedure and update location procedure may be performed. During the location update procedure, the HSS acknowledges the Update Location message by sending an Update Location Acknowledge message (IMSI, subscription data, UE usage type) to the new MME. If this is a TAU procedure and if the P-GW needs to be changed, the new MME rejects TAU Request with cause code "Implicit Detach". The UE performs re-attach and gets redirected to the dedicated MME which selects a dedicated P-GW.

If dedicated core networks are supported and the new MME does not serve UEs of the UE usage type value contained in the subscription information, the MME assigns a new GUTI to the UE. In step S130, the MME determines the MMEGI corresponding to the dedicated core network of the UE and sends a Reroute Command message (Attach/TAU Request message, MMEGI, GUTI, GUMMEI) to the eNB. This step only occurs in Attach or TAU procedure without P-GW change.

In step S140, the eNB shall reselect an MME and forward the Attach/TAU Request message to the selected MME.

In step S150, the MME uses the GUTI received along with the Attach/TAU Request message to request context from previous MME using the Identification/Context Request message. The Identification Request message also includes GUTI.

The MME uses the GUTI provided in the Identification/Context Request message to locate the context of the UE. The MME does not verify the integrity of the Attach/TAU Request message. In step S160, the previous MME provides context information in the Identification/Context Response message, which contains security information to enable the MME of the dedicated core network communicate using the existing NAS encryption and integrity protection.

Thereafter, E-UTRAN Attach/TAU procedure is continued.

Hereinafter, load re-balancing between MMEs is described. The MME load re-balancing functionality permits UEs that are registered on an MME (within an MME pool area) to be moved to another MME. An example use for the MME load re-balancing function is for the O+M related removal of one MME from an MME pool area.

The eNBs may have their load balancing parameters adjusted beforehand (e.g. the weight factor is set to zero if all subscribers are to be removed from the MME, which will route new entrants to the pool area into other MMEs).

In addition, the MME may off-load a cross-section of its subscribers with minimal impacts on the network and users (e.g. the MME should avoid offloading only the low activity users while retaining the high activity subscribers. Gradual rather than sudden off-loading should be performed as a sudden re-balance of large number of subscribers could overload other MMEs in the pool. With minimal impact on network and the user's experience, the subscribers should be off-loaded as soon as possible). The load re-balancing can off-load part of or all the subscribers.

To off-load EPS connection management (ECM) connected mode (ECM-CONNECTED) UEs, the MME initiates the S1 release procedure with release cause "load balancing TAU required". The S1 release procedure will be described later in detail. The S1 and RRC connections are released and the UE initiates a TAU but provides neither the SAE-temporary mobile subscriber identity (S-TMSI) nor the GUMMEI to eNB in the RRC establishment.

The MME should not release all S1 connections which are selected to be released immediately when offloading is initiated. The MME may wait until the S1 release is performed due to inactivity. When the MME is to be offloaded completely the MME can enforce an S1 release for all remaining UEs that were not offloaded by normal TAU procedures or by S1 releases caused by inactivity.

To off-load UEs which perform TA updates or attaches initiated in ECM-IDLE, the MME completes that procedure and the procedure ends with the MME releasing S1 with release cause "load balancing TAU required". The S1 and RRC connections are released and the UE initiates a TAU but provides neither the S-TMSI nor the GUMMEI to eNB in the RRC establishment.

When the UE provides neither the S-TMSI nor the GUMMEI in the RRC establishment, the eNB should select an MME based on the weight factors of the MMEs in the pool.

To off-load UEs in ECM-IDLE without waiting for the UE to perform a TAU or perform service request and become ECM-CONNECTED, the MME first pages UE to bring it to ECM-CONNECTED. If paging the UE fails and idle mode signaling reduction (ISR) is activated, the MME should adjust its paging retransmission strategy (e.g. limit the number of short spaced retransmissions) to take into account the fact that the UE might be in GERAN/UTRAN coverage.

Hardware and/or software failures within an MME may reduce the MME's load handling capability. Typically such failures should result in alarms which alert the operator/O+M system. Only if the operator/O+M system is sure that there is spare capacity in the rest of the pool, the operator/O+M system might use the load re-balancing procedure to move some load off this MME. However, extreme care is needed to ensure that this load re-balancing does not overload other MMEs within the pool area (or neighbouring SGSNs) as this might lead to a much wider system failure.

Hereinafter, an S1 release procedure is described. This procedure is used to release the logical S1-AP signalling connection (over S1-MME) and all S1 bearers (in S1-U) for a UE. The procedure will move the UE from ECM-CONNECTED to ECM-IDLE in both the UE and MME, and all UE related context information is deleted in the eNB. When the S1-AP signalling connection is lost, e.g. due to loss of the signalling transport or because of an eNB or MME failure, the S1 release procedure is performed locally by the eNB and by the MME. When the S1 release procedure is performed locally by the eNB or by the MME, each node performs locally its actions without using or relying on any of the signalling shown directly between eNB and MME.

The initiation of S1 release procedure is either:
  eNB-initiated with cause, e.g. O&M Intervention, Unspecified Failure, User Inactivity, Repeated RRC signalling Integrity Check Failure, Release due to UE generated signalling connection release, CS Fallback triggered, Inter-RAT Redirection, etc.; or
  MME-initiated with cause, e.g. authentication failure, detach, not allowed closed subscriber group (CSG) cell (e.g. the CSG ID of the currently used CSG cell expires or is removed from the CSG subscription data), etc.

Figure 7:
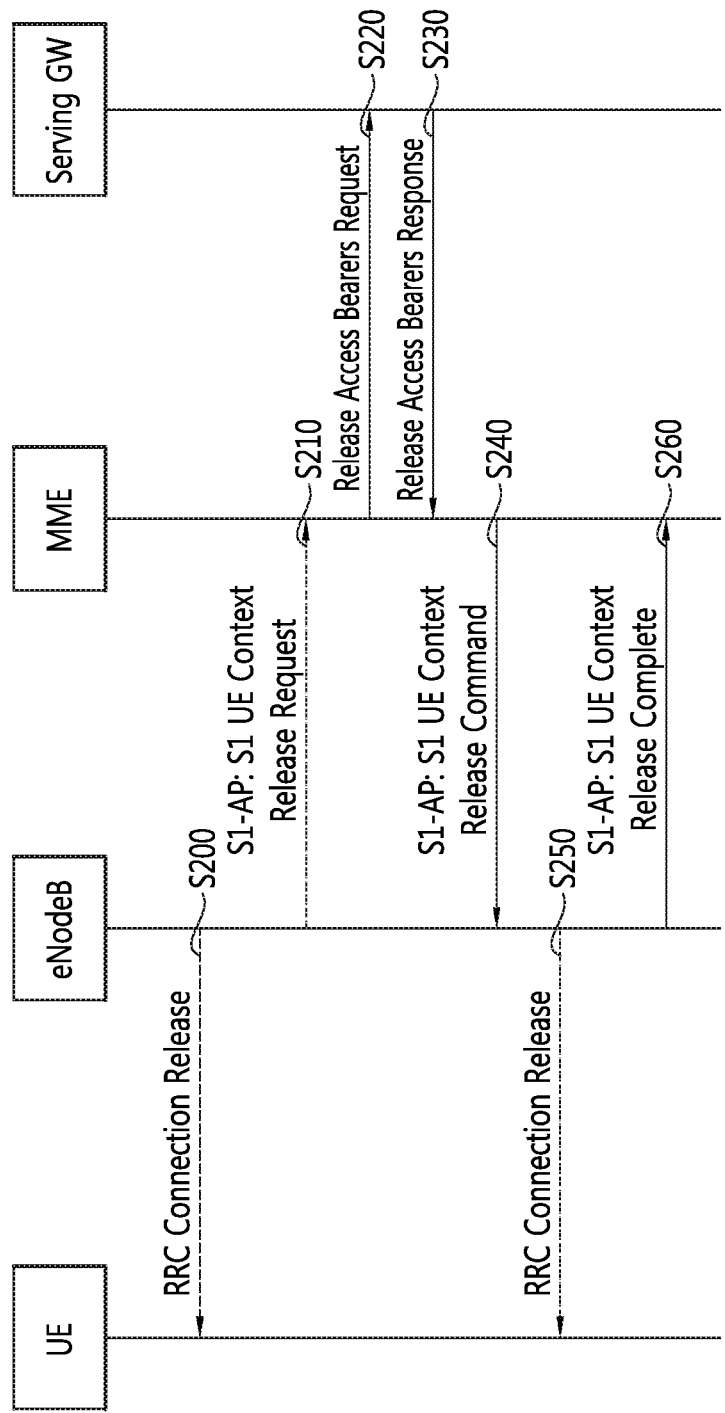
FIG. 7 shows an S1 release procedure.

FIG. 7 shows an S1 release procedure.

In step S200, in certain cases, the eNB may release the UE's signalling connection before or in parallel to requesting the MME to release the S1 context, e.g. the eNB initiates an RRC connection release for CS Fallback by redirection.

In step S210, if the eNB detects a need to release the UE's signalling connection and all radio bearers for the UE, the eNB may send an S1 UE Context Release Request (cause) message to the MME. Cause indicates the reason for the release (e.g. O&M intervention, unspecified failure, user inactivity, repeated integrity checking failure, or release due to UE generated signaling connection release).

In step S220, the MME sends a Release Access Bearers Request (abnormal release of radio link indication) message to the S-GW that requests the release of all S1-U bearers for the UE. This message is triggered either by an S1 Release Request message from the eNB, or by another MME event. The abnormal release of radio link indication is included if the S1 release procedure is due to an abnormal release of the radio link.

In step S230, the S-GW releases all eNB related information (address and tunnel endpoint IDs (TEIDs)) for the UE and responds with a Release Access Bearers Response message to the MME. Other elements of the UE's S-GW context are not affected. The S-GW retains the S1-U configuration that the S-GW allocated for the UE's bearers. The S-GW starts buffering DL packets received for the UE and initiating the "Network Triggered Service Request" procedure, if DL packets arrive for the UE.

In step S240, the MME releases S1 by sending the S1 UE Context Release Command (Cause) message to the eNB.

In step S250, if the RRC connection is not already released, the eNB may send an RRC Connection Release message to the UE in acknowledged mode. Once the message is acknowledged by the UE, the eNB deletes the UE's context.

In step S260, the eNB confirms the S1 release by returning an S1 UE Context Release Complete (E-UTRAN cell global ID (ECGI), TAI) message to the MME. With this, the signalling connection between the MME and the eNB for that UE is released. This step shall be performed promptly after step S240, e.g. it shall not be delayed in situations where the UE does not acknowledge the RRC connection release. The MME deletes any eNB related information ("eNodeB Address in Use for S1-MME", "MME UE S1 AP ID" and "eNB UE S1AP ID") from the UE's MME context, but, retains the rest of the UE's MME context including the S-GW's S1-U configuration information (address and TEIDs). All non-guaranteed bit rate (GBR) EPS bearers established for the UE are preserved in the MME and in the serving GW.

As described above, when the conventional load re-balancing is activated, the UE may receive a release request message with indication of "load balancing TAU required". Afterwards, the UE may re-establish the link with the network, but provide no GUMMEI nor S-TMSI to the eNB. That is, the eNB may not receive any indication of which MME pool the UE should be redirected to from the UE. Consequently, the eNB may select an MME based on the weight factors of the MMEs in the MME pool, but may not select previous MME.

However, the need to improve the load re-balancing functionality with regards to the introduction of dedicated core network feature may be addressed. That is, for intra-DECOR MME load re-balancing functionality that permits UEs that are registered on an MME within an MME dedicated pool to be moved to another MME within the same MME pool, enhancements may be required during the normative stage, e.g. to avoid having the UE being redirected via the default core.

More specifically, with the introduction of DECOR functionality, currently the eNB may have to decide which MME pool to select, i.e. redirect the UE to a default MME pool, or redirect the UE to a dedicated MME pool. Since the eNB does not receive any indication of which MME pool the UE should be redirected to from the UE, the eNB may most likely have to redirect the UE first to a default MME pool.

And then, the usual rerouting of the UE towards the appropriate dedicated MME pool may take place so that the UE is served by the appropriate dedicated core network eventually. This obviously shows drawbacks, especially while the UE was already handled by the correct dedicated MMEs pool before load re-balancing takes place.

In addition, when load re-balancing takes place, several UEs may usually have to be redirected to different MMEs, so avoiding useless signaling is crucial. While additional signaling may be fine during initial attach for the UE, it should be avoided for further operations within the dedicated core network. Further, load re-balancing should have minimal impact on the network side.

In summary, by the current load re-balancing functionality with the newly introduction of dedicated core network, useless signaling may occur and the initial assignment of dedicated MME/SGSN for the UE may be canceled.

In order to solve the problem described above, according to embodiments of the present invention, a method for optimizing load re-balancing for a dedicated core network is proposed. According to an embodiment of the present invention, the dedicated core networks may be kept as separate as possible during procedures which imply change of the dedicated MME pool. For example, when load re-balancing is required within a dedicated MME pool 1, the other dedicated MME pool 2 may not be impacted. That is, when load re-balancing occurs, it can be avoided that UEs are redirected to a different dedicated MME pool or to a default MME pool.

Figure 8:
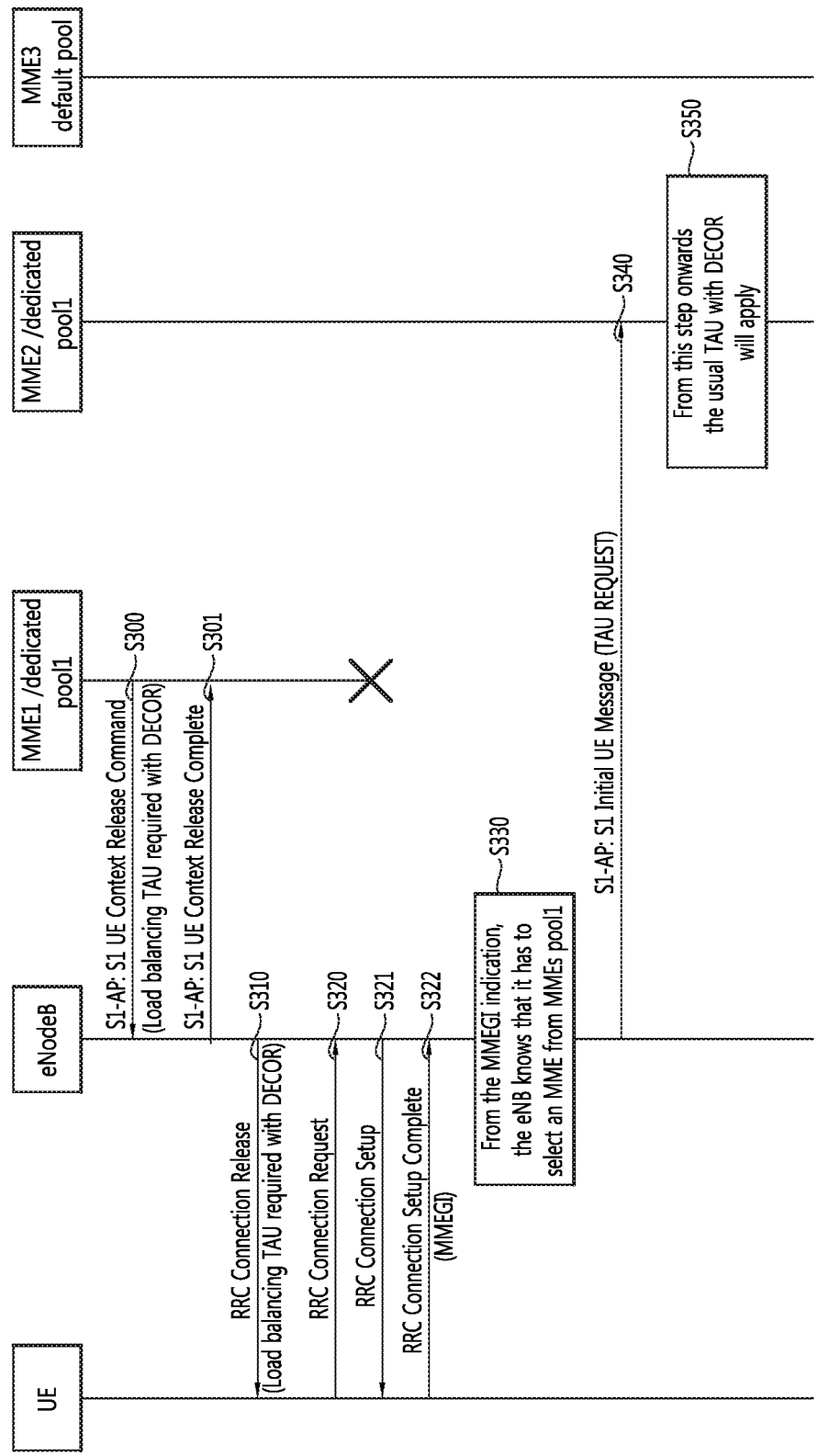
FIG. 8 shows a method for performing load re-balancing for a dedicated core network according to an embodiment of the present invention.

FIG. 8 shows a method for performing load re-balancing for a dedicated core network according to an embodiment of the present invention.

In case there is load re-balancing required in the dedicated core network, in step S300, the MME 1 in the dedicated MME pool 1 transmits the S1 UE Context Release Command message including a new cause "load balancing TAU required with DECOR" to the eNB. In step S301, the eNB transmits the S1 UE Context Release Complete message to the MME 1 in the dedicated MME pool 1.

Upon receiving the S1 UE Context Release Command message including the new cause "load balancing TAU required with DECOR", in step S310, the eNB transmit the RRC Connection Release message including a new cause "load balancing TAU required with DECOR" to the UE. Upon receiving the RRC Connection Release message including the new cause "load balancing TAU required with DECOR", the UE may know that it will have to reestablish an S1 connection with a new MME.

In step S320, the UE transmits the RRC Connection Request message to the eNB. In step S321, the eNB transmits the RRC Connection Setup message to the UE. In step S322, the UE transmits the RRC Connection Setup Complete message including an MMEGI of the dedicated MME pool 1 to the eNB. That is, when triggering RRC connection establishment, as per conventional load re-balancing functionality, the UE does not provide the S-TMSI in the RRC Connection Request message, but may provide the MMEGI in the RRC Connection Setup Complete message, upon receiving the new cause "load balancing TAU required with DECOR". The MMEGI may be included in the registered MME in the RRC Connection Setup Complete message.

Table 1 shows a part of contents in the RRC Connection Setup Complete message according to an embodiment of the present invention.

TABLE 1

| RegisteredMME ::= | SEQUENCE { | |
|---|---|---|
| plmn-Identity | PLMN-Identity | OPTIONAL, |
| mmegi | BIT STRING (SIZE (16)), | |
| mmec | MMEC | |
| } | | |

Referring to Table 1, the RRC Connection Setup Complete message may include the registeredMME field, which corresponds to the GUMMEI. And, the registeredMME field may include the MMEGI according to an embodiment of the present invention.

In step S330, upon receiving the RRC Connection Setup Complete message including the MMEGI of the dedicated MME pool 1, the eNB supporting the dedicated core network may use the MMEGI of the dedicated MME pool 1 to redirect the UE to one MME in the appropriate dedicated MME pool, i.e. MME 2 in the dedicated MME pool 1. In step S340, the eNB transmits the S1 Initial UE Message to the MME 2 in the dedicated MME pool, and in step S350, usual TAU procedure with the dedicated core network may be applied.

Consequently, according to an embodiment of the present invention, the UE can be redirected to one MME to another MME in the same dedicated MME pool. Thus, redirecting the UE to a default MME pool can be avoided, and accordingly, useless signaling in the core network can also be avoided.

Alternatively, according to another embodiment of the present invention, in case there is load re-balancing required in the dedicated core network, instead of the new cause "load balancing TAU required with DECOR", the existing cause "load balancing TAU required" in the S1 UE Context Release Command message and RRC Connection Release message may be used. In this case, all UEs, including Rel-13 UEs and legacy UEs, may provide the MMEGI of the dedicated MME pool 1 to the eNB in the RRC Connection Setup Complete message (and does not provide the S-TMSI in the RRC Connection Request message).

Upon receiving the MMEGI of the dedicated MME pool 1 from all UEs, the eNB may perform filtering according to whether or not the eNB supports the dedicated core network. That is, the eNB supporting the dedicated core network may use the MMEGI of the dedicated MME pool 1 to redirect the UE to one MME in the appropriate dedicated MME pool, i.e. MME 2 in the dedicated MME pool 1. The eNB not supporting the dedicated core network may not (or cannot) use the MMEGI of the dedicated MME pool 1. For this, the eNB may provide additional indication of whether or not the eNB supports the dedicated core network functionality via e.g. system information block (SIB). Only when receiving the additional indication indicating that the eNB supports the dedicated core network functionality, the UE may transmit the MMEGI of the dedicated MME pool 1.

Consequently, according to an embodiment of the present invention, the UE can be redirected to one MME to another MME in the same dedicated MME pool. Thus, redirecting the UE to a default MME pool can be avoided, and accordingly, useless signaling in the core network can also be avoided.

Comparing this embodiment with the embodiment described in FIG. 8, adding the new cause "load balancing TAU required with DECOR" down to the UE can be avoided, but all UEs have to transmit the MMEGI to the eNB. But as described above, only the UE receiving the additional indication indicating that the eNB supports the dedicated core network functionality may transmit the MMEGI to the eNB, when the eNB provides the additional indication via e.g. SIB. On the other hand, the embodiment described in FIG. 8 is not be applied to all UEs. Only the UE receiving the new cause "load balancing TAU required with DECOR" may provide the MMEGI to the eNB.

Figure 9:
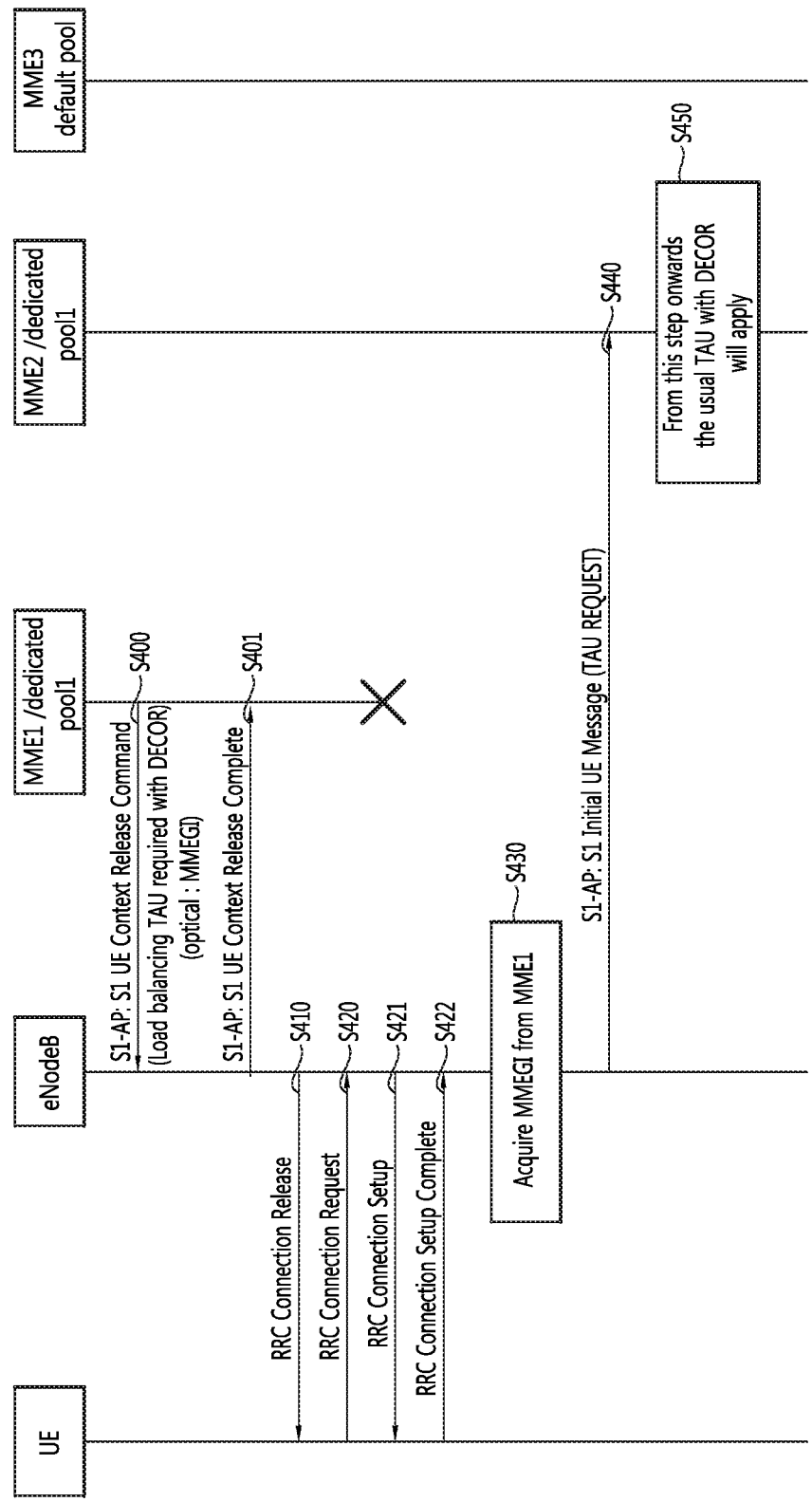
FIG. 9 shows a method for performing load re-balancing for a dedicated core network according to another embodiment of the present invention.

FIG. 9 shows a method for performing load re-balancing for a dedicated core network according to another embodiment of the present invention.

In case there is load re-balancing required in the dedicated core network, in step S400, the MME 1 in the dedicated MME pool 1 transmits the S1 UE Context Release Command message including a new cause "load balancing TAU required with DECOR" to the eNB. In step S401, the eNB transmits the S1 UE Context Release Complete message to the MME 1 in the dedicated MME pool 1.

In step S410, the eNB transmit the RRC Connection Release message to the UE. In step S420, the UE transmits the RRC Connection Request message to the eNB. In step S421, the eNB transmits the RRC Connection Setup message to the UE. In step S422, the UE transmits the RRC Connection Setup Complete message to the eNB. That is, when the UE request RRC connection again, the UE applies the conventional RRC connection procedure, i.e. does not provide the S-TMSI nor the MMEGI to the eNB.

In step S430, the eNB acquires the MMEGI of the dedicated MME pool 1 from the MME. That is, the eNB keeps track of the MMEGI of the dedicated MME pool 1 for the MME asking S1 release, i.e. MME 1 in the dedicated MME pool 1. The MMEGI of the dedicated MME pool 1 may be acquired by various methods. The MMEGI of dedicated MME pool 1 may be acquired via the S1 Initial Context Setup Request message transmitted from the dedicated MME pool 1. However, since including MMEGI of dedicated MME pool 1 in the S1 Initial Context Setup Request message is optional, the eNB may not have the MMEGI of the dedicated MME pool 1. In this case, the MMEGI of the dedicated MME pool 1 may be added as a new parameter in the S1 UE Context Release Command message, which is received in step S400 above.

Then, the eNB may redirect the UE to one MME in the appropriate dedicated MME pool, i.e. MME 2 in the dedicated MME pool 1, by using the stored MMEGI of the dedicated MME pool 1 for which an MME asked load re-balancing. In step S440, the eNB transmits the S1 Initial UE Message to the MME 2 in the dedicated MME pool, and in step S450, usual TAU procedure with the dedicated core network may be applied.

This embodiment can avoid changes of the UE side, since there is no added feature on the UE side. However, this embodiment may work only when only one dedicated MME pool triggers load re-balancing. If two MMEs pertaining to two different dedicated MME pools ask load re-balancing at the same time, this embodiment may not work.

Figure 10:
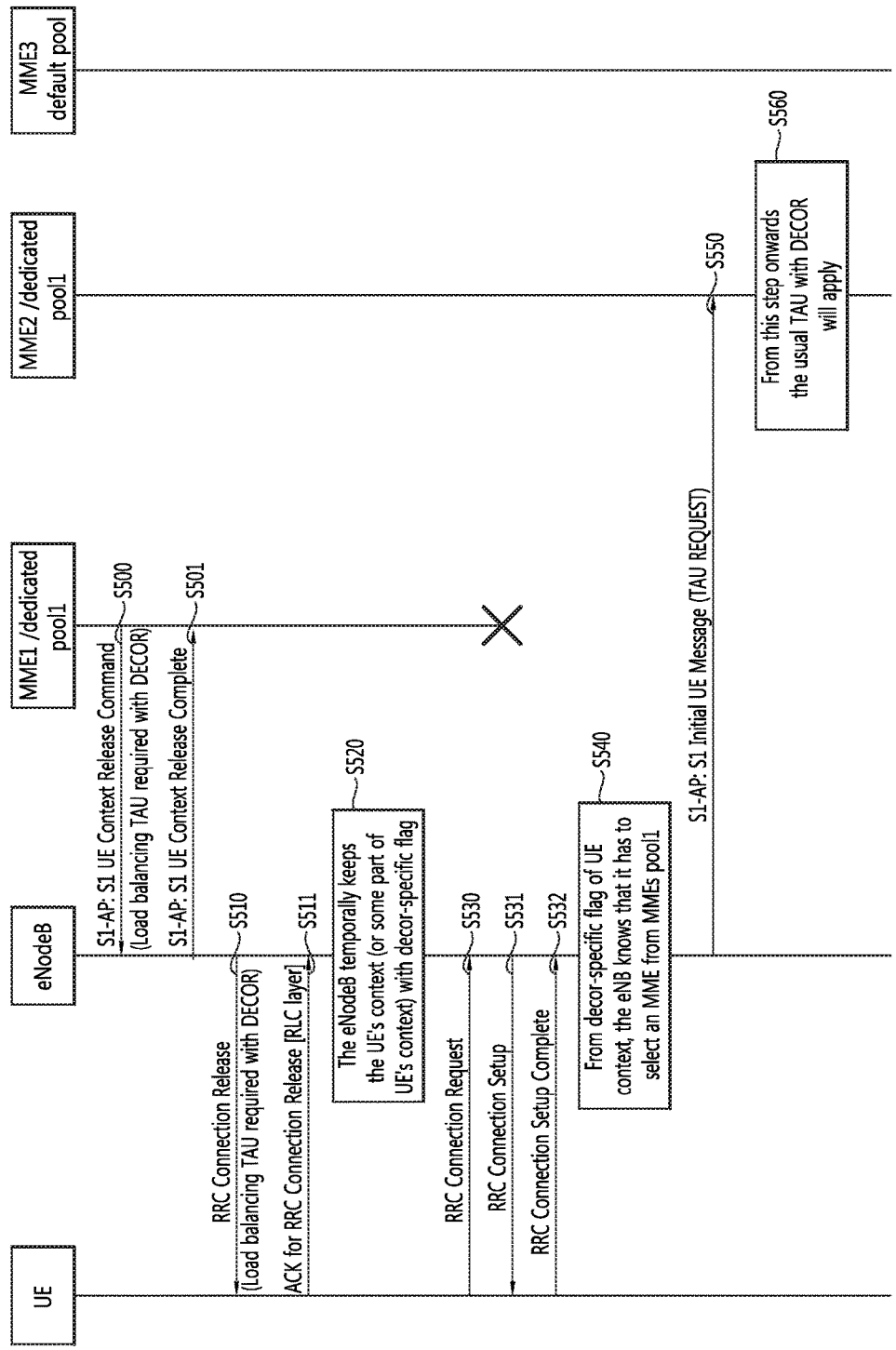
FIG. 10 shows a method for performing load re-balancing for a dedicated core network according to another embodiment of the present invention.

FIG. 10 shows a method for performing load re-balancing for a dedicated core network according to another embodiment of the present invention.

In case there is load re-balancing required in the dedicated core network, in step S500, the MME 1 in the dedicated MME pool 1 transmits the S1 UE Context Release Command message including a new cause "load balancing TAU required with DECOR" to the eNB. In step S501, the eNB transmits the S1 UE Context Release Complete message to the MME 1 in the dedicated MME pool 1.

Upon receiving the S1 UE Context Release Command message including the new cause "load balancing TAU required with DECOR", in step S510, the eNB transmit the RRC Connection Release message including a new cause "load balancing TAU required with DECOR" to the UE. In step S511, the UE transmits an acknowledgement message of the RRC Connection Release message to the eNB.

In step S520, the eNB temporally keeps the UE's context (or some part of UE's context) with decor-specific flag, instead of deleting the UE's context. The UE's context may be kept based on implementation timer or pre-configured timer.

In step S530, the UE transmits the RRC Connection Request message to the eNB. In step S531, the eNB transmits the RRC Connection Setup message to the UE. In step S532, the UE transmits the RRC Connection Setup Complete message to the eNB. That is, when the UE request RRC connection again, the UE applies the conventional RRC connection procedure, i.e. does not provide the S-TMSI nor the MMEGI to the eNB.

In step S540, from the decor-specific specific flag for the UE context, the eNB may know that it has to select an MME from the dedicated MME pool 1. Then, the eNB may redirect the UE to one MME in the appropriate dedicated MME pool, i.e. MME 2 in the dedicated MME pool 1, by using the stored UE context. In step S550, the eNB transmits the S1 Initial UE Message to the MME 2 in the dedicated MME pool, and in step S560, usual TAU procedure with the dedicated core network may be applied.

Figure 11:
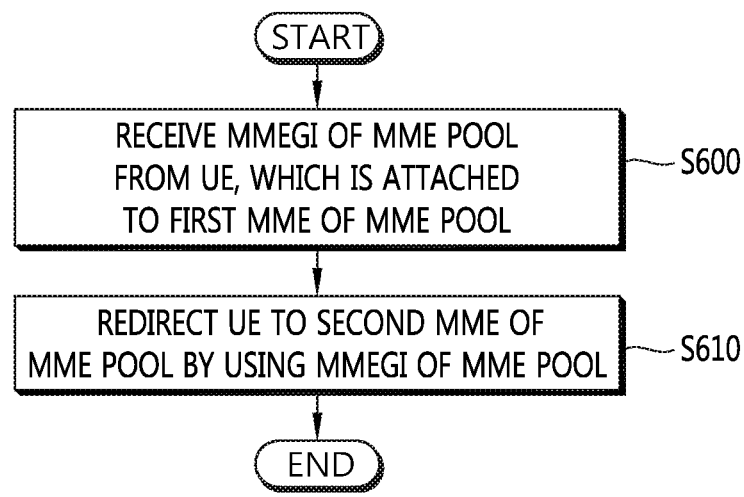
FIG. 11 shows a method for performing load re-balancing for a dedicated core network according to another embodiment of the present invention.

FIG. 11 shows a method for performing load re-balancing for a dedicated core network according to another embodiment of the present invention.

In step S600, the eNB supporting a dedicated core network receives an MMEGI of an MME pool, corresponding to the dedicated core network, from the UE which is attached to a first MME of the MME pool. The MMEGI of the MME pool may be received from the UE via the RRC Connection Setup Complete message. The MMEGI of the MME pool may be included in a GUMMEI corresponding to the first MME.

Before receiving the MMEGI of the MME pool, the eNB may receive a cause value indicating load re-balancing for the dedicated core network from the first MME. The cause value may be received from the first MME via an S1 UE Context Release Command message. Further, the eNB may transmit the cause value to the UE. The cause value may be transmitted to the UE via an RRC Connection Release message.

Alternatively, the UE may receive a cause value indicating load re-balancing from the first MME.

In step S610, the eNB redirects the UE to a second MME of the MME pool by using the MMEGI of the MME pool.

The eNB may further transmit information indicating whether or not the eNB supports the dedicated core network functionality to the UE. The information may correspond to a SIB.

Figure 12:
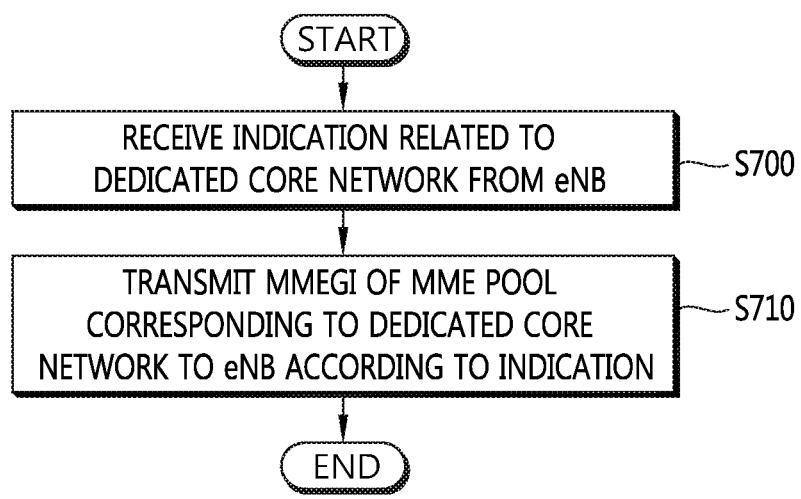
FIG. 12 shows a method for transmitting an MMEGI according to an embodiment of the present invention.

FIG. 12 shows a method for transmitting an MMEGI according to an embodiment of the present invention.

In step S700, the UE receives an indication related to a dedicated core network from the eNB. The indication may be a cause value indicating load re-balancing for the dedicated core network. In this case, the cause value may be received via the RRC Connection Release message. Alternatively, the indication may be information indicating whether or not the eNB supports the dedicated core network functionality. In this case, the information may be received via the SIB.

In step S710, the UE transmits an MMEGI of an MME pool corresponding to the dedicated core network to the eNB according to the indication. The MMEGI of the MME pool may be transmitted via the RRC Connection Setup Complete message.

As summarize the embodiments of the present invention described above, in case there is load re-balancing required in the dedicated core network, the new cause "load balancing TAU required with DECOR" may be introduced in the RRC Connection Release message. The new cause "load balancing TAU required with DECOR" included in the RRC Connection Release message may cause the new UE behavior and new eNB behavior. That is, the UE may provide the MMEGI of the dedicated MME pool in the RRC Connection Setup Complete message. In addition, the eNB supporting the dedicated core network may use the MMEGI of the dedicated MME pool to redirect the UE to one MME in the appropriate dedicated MME pool.

Further, in case there is load re-balancing required in the dedicated core network, the new cause "load balancing TAU required with DECOR" may be introduced in the S1 UE Context Release Command message. The new cause "load balancing TAU required with DECOR" included in the S1 UE Context Release Command message may cause the new eNB behavior. That is, the eNB may keep track of the MMEGI for the MME asking S1 release, and then, may redirect the UE to an MME in the appropriate dedicated MME pool using the stored information of the MMEGI for which an MME asked load balancing.

Figure 13:
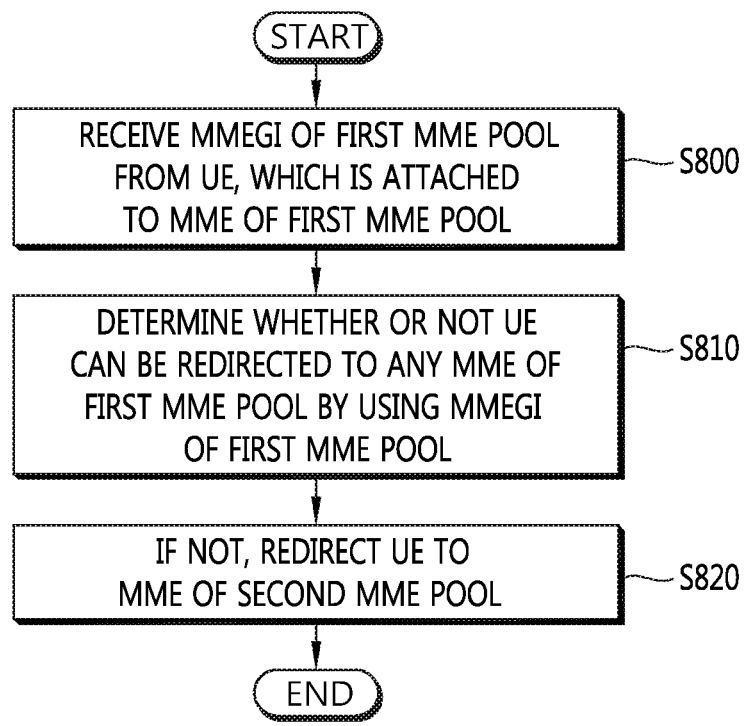
FIG. 13 shows a method for performing load re-balancing for a dedicated core network according to another embodiment of the present invention.

FIG. 13 shows a method for performing load re-balancing for a dedicated core network according to another embodiment of the present invention. This embodiment corresponds to a case that redirection to any MME in the dedicated MME pool corresponding to the MMEGI is not possible.

In step S800, the eNB supporting a dedicated core network receives an MMEGI of a first MME pool from a UE which is attached to an MME of the first MME pool. The MMEGI of the first MME pool may be received from the UE via the RRC Connection Setup Complete message. The MMEGI of the first MME pool may be included in a GUMMEI corresponding to the first MME.

Before receiving the MMEGI of the first MME pool, the eNB may receive a cause value indicating load re-balancing for the dedicated core network from the MME of the first MME pool. The cause value may be received from the MME of the first MME pool via an S1 UE Context Release Command message. Further, the eNB may transmit the cause value to the UE. The cause value may be transmitted to the UE via an RRC Connection Release message. Alternatively, the UE may receive a cause value indicating load re-balancing from the MME of the first MME pool.

In step S810, the eNB determines whether or not the UE can be redirected to any MME of the first MME pool by using the MMEGI of the first MME pool. If it is determined that the UE cannot be redirected to any MME of the first MME pool, in step S820, the eNB redirects the UE to an MME of a second MME pool.

The embodiments of the present invention described above are described with regards to E-UTRAN case. However, the applicability to UTRAN case may be considered with the same principle even if using the different messages and procedures.

Figure 14:
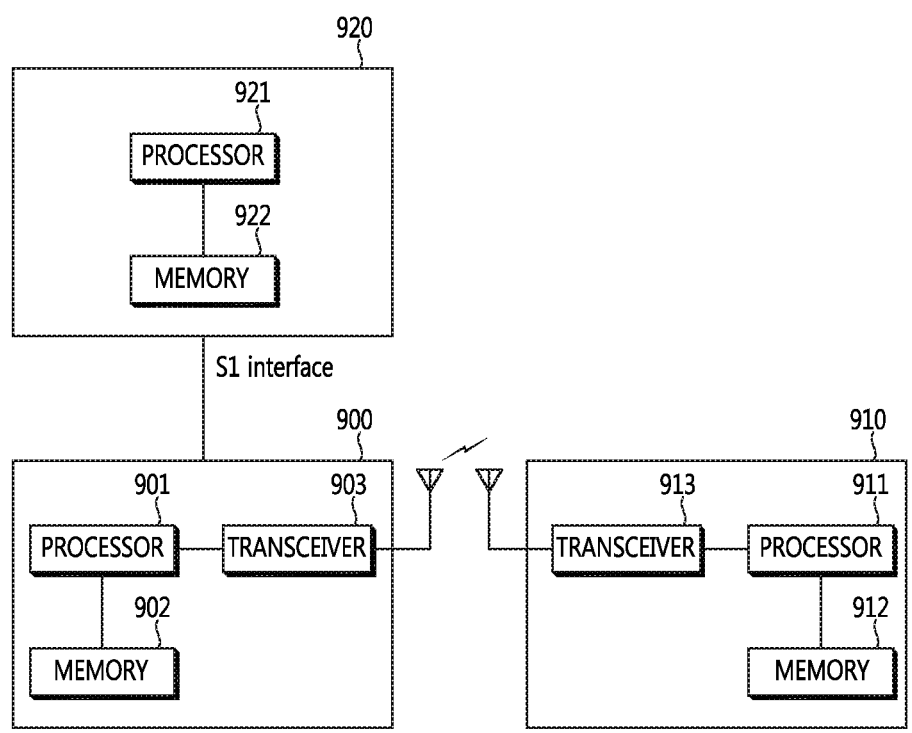
FIG. 14 shows a communication system to implement an embodiment of the present invention.

FIG. 14 shows a communication system to implement an embodiment of the present invention.

An eNB 900 may include a processor 901, a memory 902 and a transceiver 903. The processor 901 may be configured to implement proposed functions, procedures and/or methods described in this description. Layers of the radio interface protocol may be implemented in the processor 901. The memory 902 is operatively coupled with the processor 901 and stores a variety of information to operate the processor 901. The transceiver 903 is operatively coupled with the processor 901, and transmits and/or receives a radio signal.

A UE 910 may include a processor 911, a memory 912 and a transceiver 913. The processor 911 may be configured to implement proposed functions, procedures and/or methods described in this description. Layers of the radio interface protocol may be implemented in the processor 911. The memory 912 is operatively coupled with the processor 911 and stores a variety of information to operate the processor 911. The transceiver 913 is operatively coupled with the processor 911, and transmits and/or receives a radio signal.

An MME 920 may include a processor 921 and a memory 922. The MME 920 may be connected the eNB 900 via S1 interface. The MME 920 may belong to an MME pool, which corresponds to a dedicated core network. The processor 921 may be configured to implement proposed functions, procedures and/or methods described in this description. Layers of the radio interface protocol may be implemented in the processor 921. The memory 922 is operatively coupled with the processor 921 and stores a variety of information to operate the processor 921.

The processors 901, 911, 921 may include application-specific integrated circuit (ASIC), other chipset, logic circuit and/or data processing device. The memories 902, 912, 922 may include read-only memory (ROM), random access memory (RAM), flash memory, memory card, storage medium and/or other storage device. The transceivers 903, 913 may include baseband circuitry to process radio frequency signals. When the embodiments are implemented in software, the techniques described herein can be implemented with modules (e.g., procedures, functions, and so on) that perform the functions described herein. The modules can be stored in memories 902, 912, 922 and executed by processors 901, 911, 921. The memories 902, 912, 922 can be implemented within the processors 901, 911, 921 or external to the processors 901, 911, 921 in which case those can be communicatively coupled to the processors 901, 911, 921 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by an evolved NodeB (eNB) supporting a dedicated core network in a wireless communication system, the method comprising:

receiving, by the eNB, from a first mobility management entity (MME) an S1 user equipment (UE) context release command message including a cause value, which indicates load re-balancing for the dedicated core network, wherein the first MME is included in a dedicated MME pool;

transmitting, by the eNB, a radio resource control (RRC) connection release message including the cause value to a UE, wherein the RRC connection release message indicates that the eNB supports the dedicated core network functionality;

receiving, by the eNB, from the UE a RRC connection setup complete message including an MME group identity (MMEGI) indicating the dedicated MME pool;

selecting, by the eNB, a second MME among plurality of MMEs included in the dedicated MME pool; and redirecting, by the eNB, the UE to the second MME, by transmitting a S1 initial UE message to the second MME, wherein the dedicated MME pool is a specific group of the dedicated core network for a specific subscriber.

2. The method of claim 1, wherein the MMEGI of the MME dedicated pool is included in a globally unique MME identity (GUMMEI) corresponding to the first MME.

3. The method of claim 1, wherein the RRC connection release message is transmitted via a system information block (SIB).

4. An evolved NodeB (eNB) comprising:
a memory;
a transceiver; and
a processor, coupled to the memory and the transceiver, that:

controls the transceiver to receive from a first mobility management entity (MME) an S1 user equipment (UE) context release command message including a cause value, which indicates load re-balancing for a dedicated core network, wherein the first MME is included in a dedicated MME pool, controls the transceiver to transmit a radio resource control (RRC) connection release message including the cause value to a UE, wherein the RRC connection release message indicates that the eNB supports the dedicated core network functionality, controls the transceiver to receive a RRC connection setup complete message including an MME group identity (MMEGI) indicating the dedicated MME pool from the UE, selects a second MME among plurality of MMEs included in the dedicated MME pool, and redirects the UE to the second MME, by transmitting a S1 initial UE message to the second MME, wherein the dedicated MME pool is a specific group of the dedicated core network for a specific subscriber.

* * * * *